US008614406B2

(12) United States Patent
Hall, Jr. et al.

(10) Patent No.: US 8,614,406 B2
(45) Date of Patent: Dec. 24, 2013

(54) SYSTEM OF SHORT-WAVE-INFRARED HEATER SUPPORT ASSEMBLY

(75) Inventors: Edwin L. Hall, Jr., Amelia Island, FL (US); Hampton H. Tanner, Amelia Island, FL (US)

(73) Assignee: Well Traveled Imports, Inc., Amelia Island, FL (US)

( * ) Notice: Subject to any disclaimer, the term of this patent is extended or adjusted under 35 U.S.C. 154(b) by 1628 days.

(21) Appl. No.: 11/358,417

(22) Filed: Feb. 22, 2006

(65) Prior Publication Data

US 2006/0198084 A1 Sep. 7, 2006

Related U.S. Application Data

(60) Provisional application No. 60/655,401, filed on Feb. 23, 2005.

(51) Int. Cl.

| | |
|---|---|
| ***H05B 3/00*** | (2006.01) |
| ***A47B 37/00*** | (2006.01) |
| ***H02B 1/00*** | (2006.01) |
| ***F21V 21/26*** | (2006.01) |
| ***A45D 20/40*** | (2006.01) |

(52) U.S. Cl.

USPC ..................... 219/200; 108/50.13; 108/50.14; 108/64; 361/600; 361/625; 361/679.06; 361/679.12; 361/679.2; 362/270; 362/285; 362/413; 362/449; 362/450; 392/407; 392/411; 392/422

(58) Field of Classification Search

USPC .............. 108/50.13, 64, 50.14; 392/411, 422, 392/407; 219/200; 361/600, 625, 679.05, 361/679.06, 679.12, 679.2, 679.39; 362/270, 285, 413, 414, 418, 419, 427, 362/431, 449, 450

See application file for complete search history.

(56) References Cited

U.S. PATENT DOCUMENTS

| | | | | |
|---|---|---|---|---|
| 2,553,094 | A * | 5/1951 | Jarrett et al. | 362/322 |
| 3,550,179 | A * | 12/1970 | Brown et al. | 15/230 |
| 4,886,233 | A * | 12/1989 | Bateman et al. | 248/647 |
| 5,050,232 | A * | 9/1991 | Bergman et al. | 392/412 |
| 7,003,217 | B2 * | 2/2006 | Bachinski et al. | 392/411 |
| 2003/0103357 | A1 * | 6/2003 | Drake et al. | 362/403 |
| 2004/0136700 | A1 * | 7/2004 | Yackel | 392/411 |

* cited by examiner

*Primary Examiner* — Henry Yuen
*Assistant Examiner* — Ket D Dang
(74) *Attorney, Agent, or Firm* — Lau & Associates

(57) ABSTRACT

A system for heating a patio, the system comprising: a head unit comprising a heating unit configured for heating a patio; an offset assembly, wherein the offset assembly is coupled to the head unit; a mounting pole comprising a plurality of sections, the mounting pole being coupled to the offset assembly; and a base unit the base unit supporting the mounting pole.

24 Claims, 3 Drawing Sheets

SYSTEM OF SHORT-WAVE-INFRARED HEATER SUPPORT ASSEMBLY

This application claims the priority date permitted by 35 U.S.C. 119(e) of U.S. Provisional Application No. 60/655,401 filed on Feb. 23, 2005.

FIELD OF INVENTION

The invention relates generally to a patio heating device, and more specifically, system of short-wave-infrared (SWI) heater support assembly.

BACKGROUND OF THE INVENTION

Generally, freestanding Liquid Propane gas (LPG) heaters are used for heating a patio. However, the conventional LPG patio heaters do not operate with an optimal efficiency to adequately heat a sizable area. Also, in the presence of wind the efficiency of the LPG patio heater is further reduced. Additionally, the conventional LPG patio heaters are bulky and, are therefore, hard to move around. Moreover, the LPG patio heaters have to be periodically refilled.

LPG patio heaters have approximately 40% energy conversion rate and they heat only the area surrounding the subject object. Also, LPG heaters can be safely used only outdoors. Besides, the cost to operate an LPG patio heater is approximately eight times greater than a Short-Wave-Infrared (SWI) heater.

Some of the existing SWI heater systems for heating a patio are wall mounted SWI heaters, or tripod mounted SWI heaters. Wall mounted SWI heaters limit the area, which can be heated by them, to the area adjacent to the wall it is mounted on. SWI heaters that are not mounted on walls are those that are mounted on a simple tripod stand. Such tripod mounted SWI heaters require that the tripod be immediately adjacent to the heating area which is not a practical arrangement for a typical patio heater scenario because the tripod stand can get in the way and can become obtrusive.

SWI heaters have an energy conversion rate of approximately 92% and can be used indoors or outdoors. SWI heaters directly heat an object and not the air around the object. However, this means the object to be heated must be in the path of the infrared light waves. Wall mounted and tripod mounted units are often not capable of being in close enough proximity to the objects to be heated.

Therefore, there is a need for a system for heating a patio which has an efficiency of a SWI heater and has a support assembly that is non-obtrusive.

BRIEF DESCRIPTION OF THE DRAWINGS

Many of the objects and advantages of the present invention will become apparent to those of ordinary skill in the relevant art after reviewing the following detailed description and accompanying drawings, wherein.

DETAILED DESCRIPTION OF THE INVENTION

Figure 1:
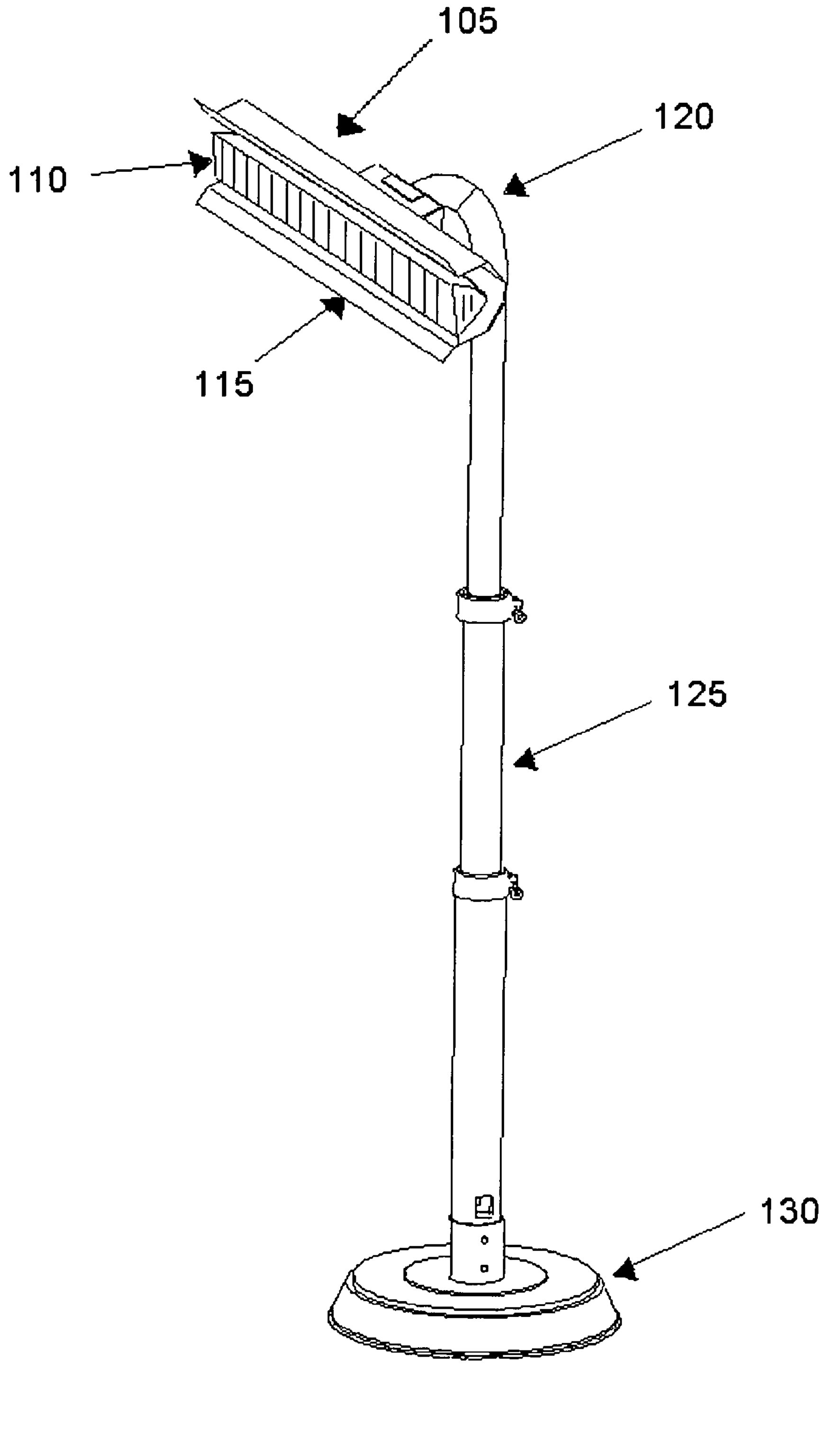
FIG. 1 illustrates a block diagram of a patio heating device in accordance with an embodiment of the present invention.

Before describing in detail embodiments that are in accordance with the present invention, it should be observed that the embodiments reside primarily in combinations of method steps and apparatus components related to a system of short-wave-infrared (SWI) heater support assembly. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments. Also, a device or structure that is “configured” in a certain way is configured in at least that way, but may also be configured in ways that are not listed.

It will be appreciated that embodiments of the invention described herein may be comprised of one or more conventional processors and unique stored program instructions that control the one or more processors to implement, in conjunction with certain non-processor circuits, some, most, or all of the functions of the system of short-wave-infrared (SWI) heater support assembly. The non-processor circuits may include, but are not limited to, clock circuits, power source circuits, and user input devices. As such, these functions may be interpreted as steps of heating a patio using a short-wave-infrared (SWI) heater support assembly. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to the various embodiments, the invention discloses a system of short-wave-infrared (SWI) heater support assembly. The support assembly, essentially, comprises a mounting pole and an angled pole section providing an offset to the SWI heater.

Referring to FIG. 1, a block diagram of a patio heating device is shown in accordance with an embodiment of the present invention. The patio heating device comprises a head unit 105. Head unit 105 may comprise a heating unit 110 such as a SWI heater. Head unit 105 can be used in a manner similar to a conventional LPG patio heater. An embodiment of the present invention, heating unit 110 is a SWI heater and an adjoining assembly that can be analogous to conventional LPG patio heaters but with additional features. The present invention enables heating a patio more effectively and more cost effectively than a conventional LPG patio heater.

Head unit 105 can further comprise a shield 115 surrounding heating unit 110 to protect heating unit 110 from, say, light rain or morning dew. Shield 115 can be made of aluminum or any suitable material.

An offset assembly 120 is coupled to head unit 105 to provide an offset to head unit 105. Those skilled in the art will appreciate that offset assembly 120 allows head unit 105, which comprises heating unit 110, to be placed in close proximity to the area being heated without being obtrusive. Offset assembly 120, basically comprises an angled pole section which ensures that head unit 105 is substantially away or 'offset' from rest of the patio heating device. In an embodiment of the present invention, head unit 105 is mounted on offset assembly 120 via a mounting device. The mounting device allows a user to adjust the position of head unit 105.

A mounting pole 125 is coupled to offset assembly 120 for easy portability and storage. Mounting pole 125 can be, for example, a telescoping pole or can comprise a plurality of sections such that the sections can be screwed together. Height of mounting pole 125 can be made adjustable by placing the plurality of sections in a particular way.

Further, a base unit 130 is coupled to mounting pole 125. Base unit 130 can comprise a plurality of wheels that also enable easy portability and storage. In an embodiment of the present invention, a weighted body, for example a weighted disc, is attached to the base unit 130. Those skilled in the art will realize that the weighted body can provide stability to the patio heating device.

Head unit 105, comprising shield 110, mounting pole 125 and base unit 130 may be made of powder-coated steel, stainless steel or other suitable material which is durable, weather proof and economic.

Figure 2:
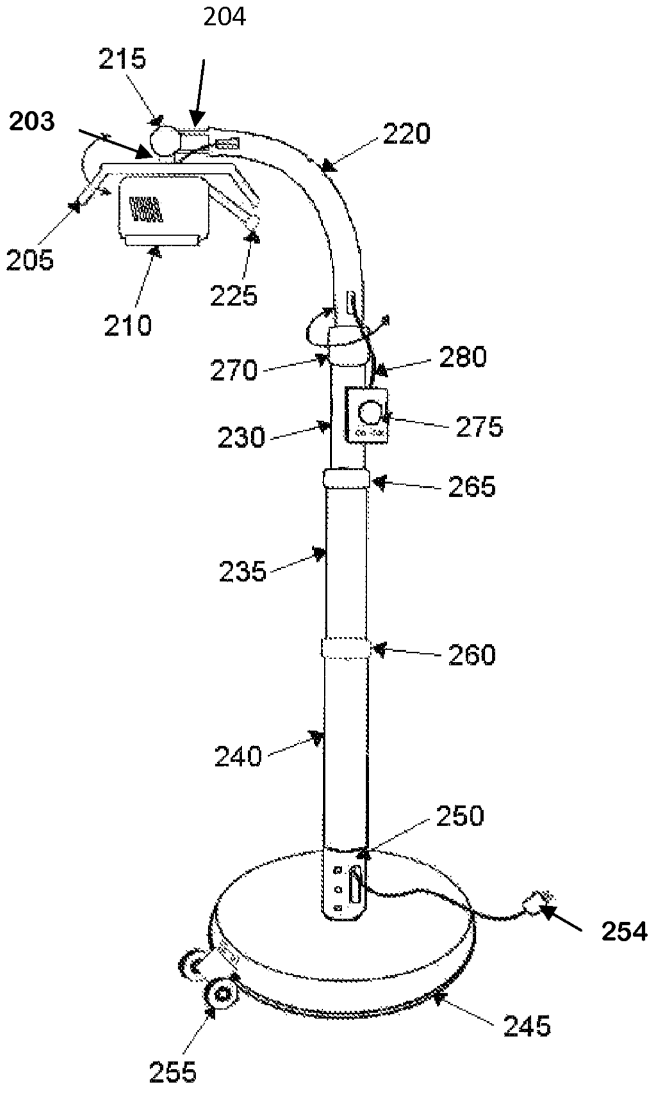
FIG. 2 illustrates a side view of a short-wave-infrared (SWI) heater support assembly in accordance with an embodiment of the present invention.

Turning now to FIG. 2, a side view of a short-wave-infrared (SWI) heater support assembly is shown in accordance with an embodiment of the present invention. A shield 205 is used to house a SWI heater 210 in the SWI heater support assembly. Shield 205 can be made of aluminum or any other suitable material. Shield 205 can provide SWI heater 210 protection from light rain or morning dew. Shield 205 together with SWI heater 201 forms head unit 105 of FIG. 1. Those skilled in the art shall realize that the shape of shield 205 is not restricted to the one shown in FIG. 2 and can be of any shape, provided it protects SWI heater 210.

In an embodiment of the present invention, shield 205 can be mounted on angled pole section 220 via a rotating collar mount 215 having a first portion 203 and a second portion 204, for example a 45-degree rotating collar mount. Rotating collar mount 215 allows head unit 105, to be rotated about rotating collar mount 215 so that a user can adjust head unit 105 to direct the heat towards an area to be heated. Moreover, angled pole section 220 can have a 110 to 120 degree bend to provide an offset to head unit 105. Those of ordinary skill in the art shall realize that having head unit 105 offset from rest of the short-wave-infrared (SWI) heater support assembly allows head unit 105 to heat from overhead instead of directly adjacent to, for example from the side of, the area to be heated.

An embodiment of the present invention also comprises a positioning bar 225 coupled to SWI heater 210. Positioning bar 225 can allow the user to adjust the position of SWI heater 210 without having to touch SWI heater 210, which can get hot while SWI heater 210 is operating.

The mounting pole shown in the embodiment depicted in FIG. 2 comprises three sections, an uppermost section 230, a middle section 235 and a bottommost section 240, in addition to angled pole section 220. The three sections enable the mounting pole to be adjustable, for example the three sections can be telescoping or can be screwed together. Angled pole section 220 is coupled to uppermost section 230 of a mounting pole. The mounting pole, for example a telescoping pole, allows the SWI heater support assembly to be compact for shipping and can minimize the height of the SWI heater support assembly for easy storage. When the mounting pole is retracted, the height of head unit 105, in accordance with an embodiment of the present invention, may be reduced by approximately 30 inches to approximately 64 inches. In accordance with an embodiment of the present invention, when the sections are substantially fully extended, head unit 105 has a height of approximately 94 inches. This height allows the head unit 105 to be high enough to heat from overhead. Those skilled in the art will realize that other dimensions for the mounting pole can also be used and is within the scope of the present invention.

Bottommost section 240 of the mounting pole is mounted on a base unit 245. Base unit 245 can be circular in shape. However, those skilled in the art will realize that different dimensions and shape can also be used for base unit 245 and are within the scope of the present invention.

In one embodiment of the present invention, a weighted body, like a weighted disc, providing stability to the SWI heater support assembly is mounted on the underside of base unit 245. Those skilled in the art will realize that the weighted body can provide stability for the SWI heater support assembly thereby compensating for the weight of SWI heater 210 in head unit 105, which is offset from the center of base unit 245 and mounting pole. A steel flange 250 can be mounted to the top of base unit 245. Bottommost section 240 of the mounting pole may be fastened to steel flange 250. On a side surface of the steel flange 250 is a receptacle 252 to accommodate a power cord with a power plug 254. Also, a plurality of wheels 255 can be attached to base unit 245 enabling the SWI heater support assembly to be easily moved.

In accordance with the embodiments of the present invention, a tightening collar 260 is affixed to the upper portion of bottommost section 240. Middle section 235 can be inserted in tightening collar 260 and affixed to bottommost section 240. Another tightening collar 265 can be used to attach uppermost section 230 to middle section 235. Those skilled in the art will realize that if the mounting pole is desired to be telescoping in nature, uppermost section 230 may need to be smaller in diameter than middle section 235 and middle section 235 may need to be smaller in diameter than bottommost section 240. An attachment, coupling collar 270 can be mounted on the top of uppermost section 230 so that angled pole section 220 can be inserted in attachment coupling collar 270. Adjacent a distal end of the angled pole section is a receptacle 217 for accommodating power line purposes. Adjacent another end of the angled pole section is a receptacle 219 also for accommodating power line purposes. Those skilled in the art will realize that attachment coupling collar 270 can be mounted on top of uppermost section 230 such that angled pole section 220 can be freely rotated about attachment coupling collar 270, for example a 360 degree rotation of angled pole section 220 is possible as illustrated by radial arrows 272. Angled pole section 220 can bend at an approximate 110 to 120 degree angle or may be otherwise angled relative to uppermost section 230, middle section 235 and bottommost section 240.

In an embodiment of the present invention, a power switch coupled to a dimmer 275 are mounted to the mounting pole with a power cord 280 running to head unit 105 and providing power to SWI heater 210. Power switch coupled to a dimmer 275 can allow a user to turn SWI heater 210 on and off and to adjust the heat output.

Figure 3:
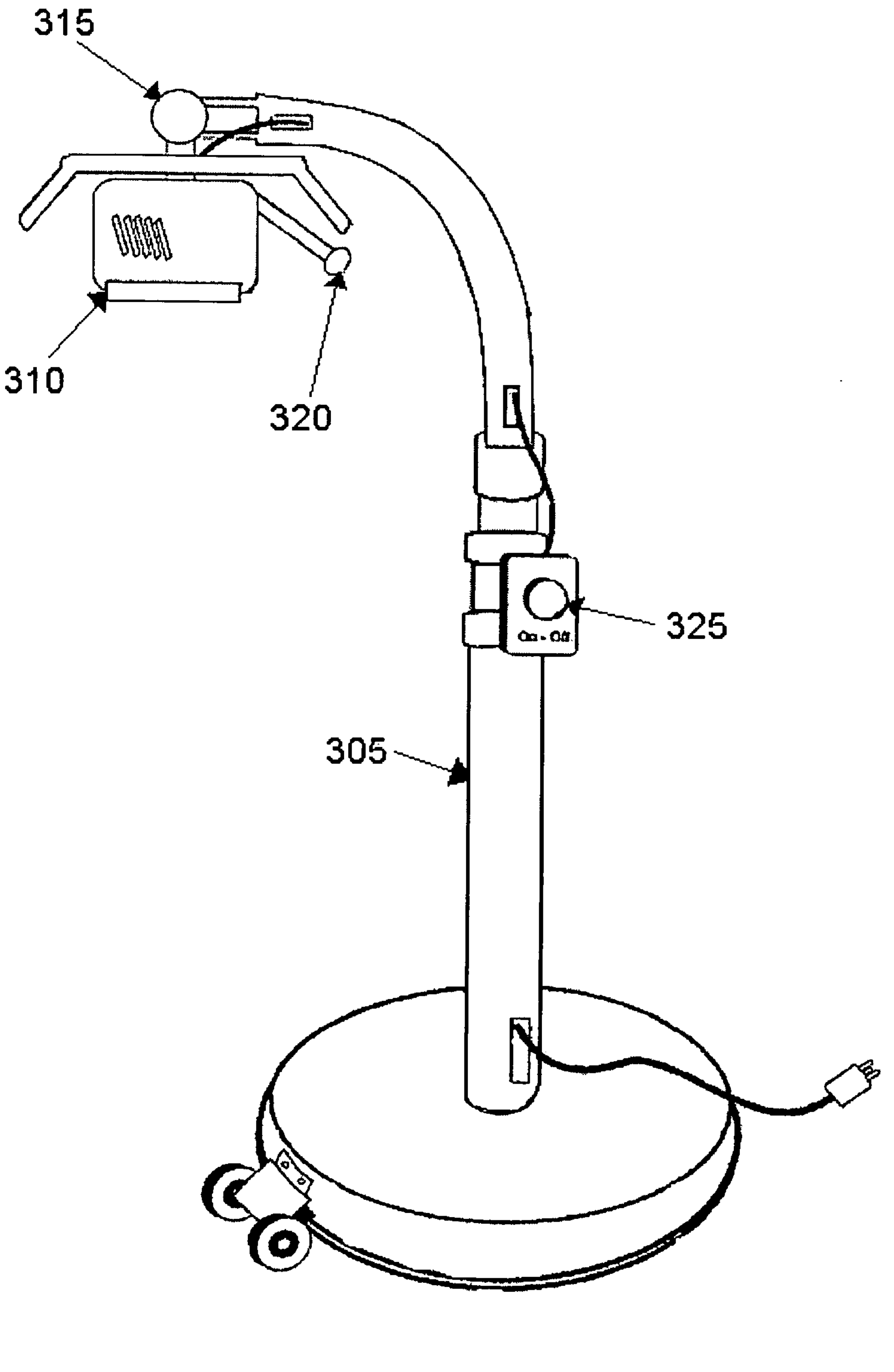
FIG. 3 illustrates an exemplary embodiment of a retracted short-wave-infrared (SWI) heater support assembly in accordance with an embodiment of the present invention.

Turning now to FIG. 3, an exemplary embodiment of a retracted short-wave-infrared (SWI) heater support assembly is shown in accordance with an embodiment of the present invention. Uppermost section 230 and middle section 235 of the mounting pole of FIG. 2 are retracted to obtain a mounting pole 305 with a decreased height. Therefore, the height of a SWI heater 310 can be adjusted by the virtue of the present embodiment. Moreover, the position of SWI heater 310 can be changed using a rotating collar mount 315 and a positioning bar 320. For example, if a user is sitting on a chair and wishes to have SWI heater 310 directed towards him form the side, mounting pole 305 can be retracted and adjusted accordingly as depicted in the present embodiment and rotating collar mount 315 and positioning bar 320 can be adjusted according to the user's comfort. Also, the heat output of SWI heater 310 can be adjusted using a power switch coupled to a dimmer 325.

Therefore, the embodiments of the present invention relate to the SWI heater support assembly with an offset mounting pole. Such a heater can solve the problems of a conventional SWI heater support assembly, for example a tripod mounted unit which falls over easily, by making the SWI heater a free standing stable unit with an offset design. This design allows a user to place the SWI heater immediately above or adjacent to the objects to be heated without the SWI heater being obtrusive. More specifically, the offset design of the SWI heater support assembly allows head unit 105 to overhang the area to be heated without base unit 245 and the mounting pole of the SWI heater support assembly needing to be placed in the space to be heated.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The inventions defined solely by the appended claims including any amendments made during the pendency of this application and all equivalents of those claims as issued.

What is claimed is:

1. A heating device, comprising:

a head unit, the head unit comprising a heating unit configured for radiating heat;

an offset assembly, wherein the offset assembly and the head unit are each directly coupled to a rotatable mounting device which device rotatably enables aiming of said head unit to irradiate heat toward a full range of directions from vertically upward to vertically downward;

a mounting pole made of a plurality of telescoping tubes each concentrically slidable relative to another to adjust a height of the head unit, the mounting pole being coupled to the offset assembly; and a base unit, the mounting pole being supported at a center portion of the base unit.

2. The heating device of claim 1, wherein the offset assembly comprises an angled pole section.

3. The heating device of claim 1, wherein the rotatable mounting device allows a user to manually and directly adjust a position of the head unit.

4. The heating device of claim 1, wherein the head unit further comprises a positioning bar, the positioning bar allows a user to manually and directly adjust a position of the heating unit.

5. A heater support assembly, comprising:

a heating unit, the heating unit mounted on a head unit;

an angled pole section, the angled pole section providing an offset to the heating unit and wherein the angled pole section and the heating unit are each directly coupled to a rotatable mounting device which device rotatably enables aiming of the heating unit to irradiate heat toward with a full range of directions from vertically upward to vertically downward; and a mounting pole made of a plurality of telescoping tubes each concentrically slidable relative to another to adjust a height of the heating unit, the angled pole section being mounted on the mounting pole.

6. The heater support assembly of claim 5, wherein a bottommost section of the mounting pole is mounted at a center portion of a base unit, the base unit provides stationary stability to the heater support assembly.

7. The heater support assembly of claim 5 further comprises a power switch coupled to a dimmer, the power switch coupled to the dimmer enables a user to adjust a heat level output from the heating unit.

8. The heater support assembly of claim 5, wherein the angled pole section is mounted on an uppermost section of the mounting pole such that at least 360 degrees of rotation for the angled pole section is facilitated around an imaginary vertical axis of the heater assembly.

9. A heater-unit with adjustable radiation aims and adjustable heights, comprising:

a heater-head directly mounted on a first portion of a rotatable-collar-mount;

a distal end of an angled-pole-section directly mounted on a second portion of the rotatable-collar-mount;

another end of the angled-pole-section opposite to the distal end is mounted on one end of one of a plurality of telescoping tubes each slidable relative to another;

a lower-most one of the plurality of telescoping tubes is securely mounted at a center portion of a base; and a bottom surface of the base frictionally stabilized the heater-unit on a surface of a ground-supported by gravity; and a plurality of collars each releasably affixing one of the plurality of telescopic tubes to another of the plurality of telescopic tubes by frictional hold to adjust heights of the heater-unit;

wherein the distal end of the angled-pole section pre-disposed the heater-head toward one direction and the rotatable-collar-mount rotatably and manually provides adjustable radiation aims for the heater-head to irradiate heat toward a full range of directions from vertically upward to vertically downward.

10. The heater-unit with adjustable radiation aims and adjustable heights of claim 9, wherein a pair of wheels is mounted on a rim surface of the base and the heater-unit is transportable by the pair of wheels when the heater-unit is tilted at an angle that the bottom surface of the base is detached from the surface of the ground-support and the pair of wheels engage the surface of the ground-support.

11. The heater-unit with adjustable radiation aims and adjustable heights of claim 9, wherein a side surface adjacent a distal end of the angled-pole-section comprises a first receptacle allowing a power cord to pass there-through and allowing visual inspection of cord conditions upon rotation of said rotatable-collar-mount;

wherein located adjacent a side surface of said another end of the angled-pole-section opposite to the distal end comprises a second receptacle allowing the power control cord to pass there-through; and wherein said top portion of the base comprises a third receptacle allowing the power cord with a plug to pass there-through.

12. The heater-unit with adjustable radiation aims and adjustable heights of claim 9, wherein said another end of the angled-pole-section is rotatably mounted with 360 degrees of freedom on said one end of one of the plurality of telescoping tubes; and wherein said second receptacle accommodates placement and allows visual inspection of said power cord upon exercising any of said 360 degrees of freedom.

13. The heater-unit with adjustable radiation aims and adjustable heights of claim 9, wherein the heater-head is a short wave infrared (SWI) heater-head.

14. The heater-unit with adjustable radiation aims and adjustable heights of claim 9, wherein a dimmer with a built-in on and off switch is mounted on a side surface of one of said plurality of telescoping tubes.

15. A heating device, comprising:

a head unit, the head unit comprising a heating unit configured for radiating heat;

an offset assembly, wherein the offset assembly and the head unit are each directly coupled to a rotatable mounting device which device rotatably enables aiming of said head unit to irradiate heat toward a full range of directions from vertically upward to vertically downward;

a mounting pole made of a plurality of telescoping tubes having a plurality of diameters each concentrically slidable relative to another and the plurality of telescoping tubes with a small diameter being in a higher position than the plurality of telescoping tubes with a large diameter to adjust a height of the head unit wherein the plurality of telescoping tubes are affixed by frictional hold to an overall length by a plurality of tightening collars, the mounting pole being coupled to the offset assembly; and a base unit, the mounting pole being supported at a center portion of the base unit.

16. A short-wave-infrared heater (SWI) support assembly, comprising:

a heating unit, the heating unit mounted on a head unit;

an angled pole section, the angled pole section providing an offset to the heating unit and wherein the angled pole section and the heating unit are each directly connected to a rotatable mounting device with a range of rotatable motions between up and down; and a mounting pole made of a plurality of telescoping tubes each concentrically slidable relative to another and the plurality of telescoping tubes with a small diameter being placed in a higher position than the plurality of telescoping tubes with a large diameter to adjust a height of the heating unit wherein the plurality of telescoping tubes are affixed by frictional hold to a length by a plurality of tightening collars, the angled pole section being mounted on the mounting pole; and a base unit onto which the mounting pole is mounted thereon;

wherein the head unit further comprises a positioning bar, the positioning bar allows a user to manually and directly adjust a position of the heating unit;

wherein the angled pole section is mounted on an uppermost section of the mounting pole such that at least 360 degrees of rotation for the angled pole section is facilitated around an imaginary vertical axis of the short-wave-infrared heater support assembly;

wherein a first receptacle accommodates placement and allows visual inspection of said power cord upon exercising any of said 360 degrees of freedom.

17. The heating device of claim 16, wherein the heating unit is a short-wave-infrared (SWI) heater.

18. The heating device of claim 16, wherein the head unit further comprises a shield coupled to the heating unit, the shield providing protection to the heating unit.

19. The heating device of claim 14, wherein the offset assembly comprises a power switch to turn on or turn off the heating device.

20. The heating device of claim 16, wherein the base unit comprises a plurality of wheels, the plurality of wheels enabling the heating device to be relocated with ease.

21. The heating device of claim 16, wherein the base unit comprises a weighted body, the weighed body provides stationary stability to the heating device.

22. The heating device of claim 16, wherein the base unit comprises a second receptacle configured to allow a power cord to be connected to the heating device, the power cord enables electrical power to be supplied to the heating unit.

23. The short-wave-infrared heater support assembly of claim 6, wherein a bottommost section of the mounting pole is mounted at a center portion of a base unit, the base unit provides stationary stability to the short-wave-infrared heater support assembly.

24. The short-wave-infrared heater support assembly of claim 16, wherein the heating unit is rotatably aimed toward a full range of directions between vertically upward and vertically downward.

* * * * *